US010111303B2

(12) United States Patent
Pandharipande et al.

(10) Patent No.: US 10,111,303 B2
(45) Date of Patent: Oct. 23, 2018

(54) CALIBRATION OF LIGHT SENSORS

(71) Applicant: PHILIPS LIGHTING HOLDING B.V., Eindhoven (NL)

(72) Inventors: Ashish Vijay Pandharipande, Eindhoven (NL); David Ricardo Caicedo Fernandez, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/556,858

(22) PCT Filed: Mar. 2, 2016

(86) PCT No.: PCT/EP2016/054393
§ 371 (c)(1),
(2) Date: Sep. 8, 2017

(87) PCT Pub. No.: WO2016/142230
PCT Pub. Date: Sep. 15, 2016

(65) Prior Publication Data
US 2018/0054873 A1      Feb. 22, 2018

(30) Foreign Application Priority Data

Mar. 11, 2015   (EP) .................... 15158693

(51) Int. Cl.
*H05B 37/02*      (2006.01)
*G01J 1/42*       (2006.01)
*G01J 1/44*       (2006.01)

(52) U.S. Cl.
CPC ........ *H05B 37/0218* (2013.01); *G01J 1/4204* (2013.01); *G01J 1/44* (2013.01); *G01J 2001/4247* (2013.01); *G01J 2001/444* (2013.01)

(58) Field of Classification Search
CPC ................ H05B 37/02; H05B 37/0218; H05B 37/0227; H05B 37/0272; H05B 37/0281;
(Continued)

(56) References Cited

U.S. PATENT DOCUMENTS 7,608,807 B2    10/2009  Hick et al.
8,242,707 B2 *   8/2012  Lum ................. H05B 37/0218
                                                    315/149
(Continued)

FOREIGN PATENT DOCUMENTS

WO      2014053954 A1    4/2014

OTHER PUBLICATIONS

Park, Kwang-Wook, et al., "Workplane Illuminance Prediction Method for Daylighting Control Systems," Dept. of Building, Civil and Environmental Engineering, Solar Energy, Elsevier 2003 (4 Pages).

*Primary Examiner* — Jimmy Vu
(74) *Attorney, Agent, or Firm* — Akarsh P. Belagodu

(57) ABSTRACT

A calibration method comprising, for each of one or more light sensors: (a) under influence of one or more substantially non-zero illumination levels in the target environment, using the light sensor to measure the sensed light level corresponding to each of these one or more illumination levels; (b) receiving a template light level value corresponding to each of the one or more illumination levels, representing the light level at a target location in the target environment substantially removed in space from the location of the light sensor, each of the one or more template light level values being assumed for the environment rather than measured by a light meter; and (c) determining a relationship between the sensed light level and the light level
(Continued)

experienced at the target location, based on an evaluation of the one or more sensed levels relative to the one or more template light level values.

14 Claims, 2 Drawing Sheets

(58) Field of Classification Search
CPC ............... H05B 33/08; H05B 33/0833; H05B 33/0854; G08B 5/36; Y02B 20/40; Y02B 20/42; Y02B 20/46
USPC .... 315/149, 151–159, 209 R, 291, 307, 308, 315/312
See application file for complete search history.

(56) References Cited

U.S. PATENT DOCUMENTS

| | | | |
|---|---|---|---|
| 8,415,900 B2 * | 4/2013 | Covaro | G01J 1/18 315/307 |
| 2011/0227117 A1 | 9/2011 | Verschuren et al. | |
| 2012/0235579 A1 | 9/2012 | Chemel et al. | |
| 2013/0134886 A1 | 5/2013 | Golding et al. | |
| 2014/0042911 A1 | 2/2014 | Noguchi et al. | |

* cited by examiner

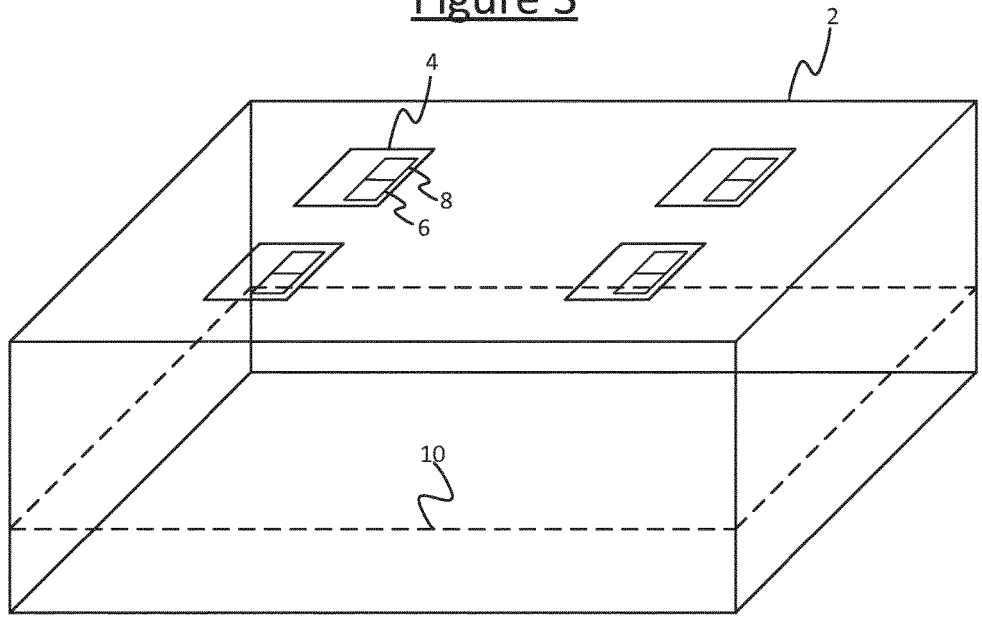
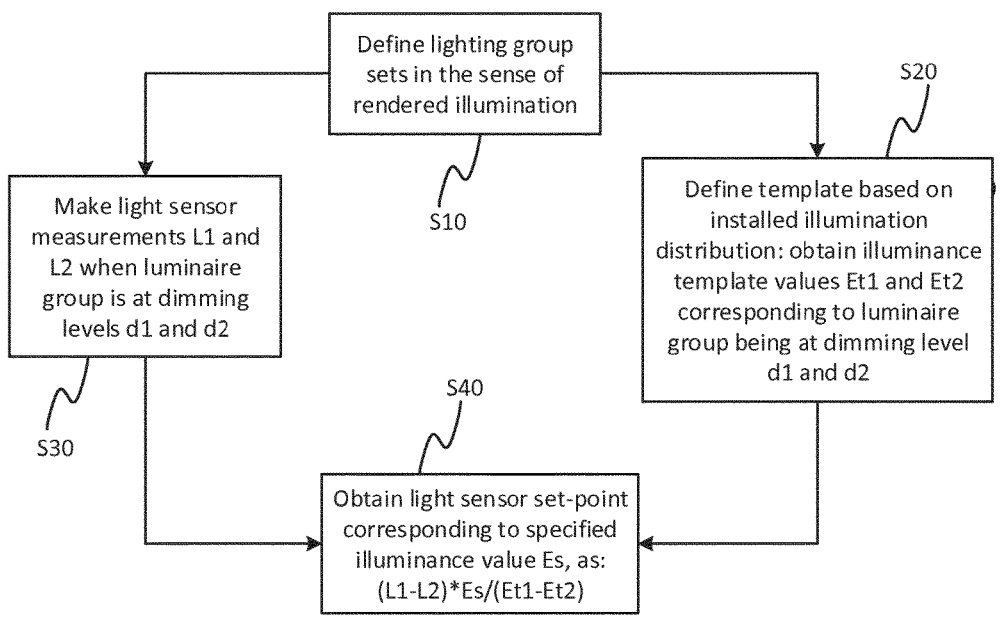

CALIBRATION OF LIGHT SENSORS

CROSS-REFERENCE TO PRIOR APPLICATIONS

This application is the U.S. National Phase application under 35 U.S.C. § 371 of International Application No. PCT/EP2016/054393, filed on Mar. 2, 2016, which claims the benefit of European Patent Application No. 15158693.0, filed on Mar. 11, 2015. These applications are hereby incorporated by reference herein.

TECHNICAL FIELD

The present disclosure relates to the calibration of one or more light sensors, each used to control the light emitted by a respective one or more light sources.

BACKGROUND

Many lighting systems for illuminating an environment such as a room, employ one or more light sensors to sense an amount of light in the environment and to adapt the emitted illumination in dependence on the sensed level of light, e.g. to adapt the emitted illumination in dependence on the amount of daylight in the environment. An existing problem in such lighting systems designed is how to perform calibration of light sensors easily and accurately for proper control operation.

A light sensor is typically mounted on the ceiling, facing-down so as to measure the light reflected back to it from the surface or surfaces below. Thus for a given illumination at the horizontal workspace plane, the amount of light the light sensor measures may differ depending on the reflectance of the surface(s) in its field of view. The objective in most lighting control applications is to maintain a specified illumination level at the height of the horizontal workspace plane, for example, over the top surface of a desk. However the control of the illumination is based on the sensor measurements taken by the sensor on the ceiling, so as to achieve a reference set-point defined for the light sensor reading. As such, a relation needs to be established between the sensed light level at the sensor and the actual light level at workspace below it, which is done via calibration.

Existing calibration methods rely on manual commissioning wherein a commissioning agent turns on the luminaires at a specific, known dimming level, e.g. fully, and measures the illuminance using a light meter placed at one or more positions in the workspace plane. The light sensor measurements are then suitably scaled based on the workspace light meter measurements, in order to determine controller set-points such that a desired illuminance at workspace plane is met.

SUMMARY

The traditional method is cumbersome and time-consuming since a commissioning agent has to calibrate each light sensor using a light meter, to take one or multiple measurements under each sensor. Such methods do not scale effectively with the number of light sensors to be calibrated, and are especially cumbersome and time-consuming for a deployment of large number of sensors in buildings or the like. It would be desirable to calibrate light sensors in a fast, simple and scalable manner.

The following discloses a method whereby instead of light meter readings, a scheme of lighting system templates is used to perform a calibration more quickly and/or conveniently than the conventional method, with little to no manual effort, while retaining a reasonable accuracy.

According to one aspect disclosed herein, there is provided a method of calibrating one or more light sensors, in a target environment (e.g. a given room) where each of the one or more light sensors is arranged to control a respective one or more light sources for providing or contributing to an illumination of the target environment, based on sensing a light level. The method comprises, for each of the one or more light sensors: (a) under influence of one or more substantially non-zero levels of said illumination, using the light sensor to measure the light level corresponding to each of said one or more illumination levels; and (b) receiving a template light level value corresponding to each of the one or more illumination levels, representing a light level at a target location in the target environment substantially removed in space from a location of the light sensor, each of the one or more template light level values being assumed for said environment rather than measured by a light meter. E.g. the target location may be the workspace plane, with the light sensor(s) being located on the ceiling. The method then comprises (c) determining a relationship between the sensed light level and the light level experienced at the target location, based on an evaluation of the one or more sensed levels relative to the one or more template light level values.

In embodiments, there is further provided a method of controlling one or more lights sources based on the above calibration method. This method further comprises: (d) receiving an indication of a desired light level for the target location; (e) for each of the one or more light sensors, determining a set-point for the light sensor based on the determined relationship between the sensed light level and the light level at the target location, the set-point specifying a target value for the sensed light level in order to achieve a desired light level at the target location; and (f) adjusting the respective one or more light sources until the target value for the sensed light level is sensed by the light sensor.

Note that the notation (a) to (f) does not necessarily imply an order. E.g. it is also possible to first obtain a template, then set luminaires at dimming levels at which the template is defined, then make light sensor measurements at that dimming level, and then calibrate the light sensors.

In embodiments, the receiving of said indication of the desired light level may comprise any one of: (i) receiving the indication of the desired light level as a user input, (ii) retrieving the indication from a predetermined store in memory, or (iii) receiving the indication based on a timer.

The receiving of said one or more template light level values may comprise any one of: (I) retrieving the one or more template light level values from a predetermined store in memory; (II) receiving the one or more template light values as a user input, (III) receiving the one or more template light level values from a computer model of the target environment, or (IV) measuring the one or more template light level values from a light meter in another environment, based on an assumption that said other environment is approximately equivalent to said target environment, having an approximately equivalent illumination distribution, and that the light meter is placed at an approximately equivalent location to said target location. Other possibilities are also not necessarily excluded.

In one particularly advantageous embodiment, the template light level values are measurements from a light meter in another environment (e.g. a different room), based on an assumption that said other environment is approximately equivalent to said target environment, having an approximately equivalent illumination distribution, and that the light meter is placed at an approximately equivalent location to said target location (e.g. in the workspace plane). This way the calibrating technician can re-use light meter measurements already taken from one environment, e.g. only taking light meter measurements in one room of a building then re-using the measurements as a template when moving to calibrate the sensors in another similar room.

Alternatively, the template levels may be based on a computer model or other model of the target environment (i.e. modelling the illumination in the target environment).

In embodiments, the template light level values may be selected from a pre-specified finite set (whether the set is determined from actual measurements of another environment, of from a computer model or other model, or simply from the system designer's skill and judgement).

In embodiments, the one or more sensed light levels may comprise at least two sensed light levels, with the one or more template light level values comprising two corresponding template light level values. In this case the determining of said relationship may be based on an evaluation of a difference between the two sensed light levels relative to a difference between the two template light level values.

Alternatively, the one or more sensed levels may in fact be a single sensed light level, with the one or more template light level values being a single corresponding template light level value. In this case, the determining of said relationship is based on an evaluation of the single sensed light level relative to the single template light level value, by assuming as a second calibration point that the sensed light level is zero when the illumination level is zero.

In embodiments, the determining of said relationship may comprise determining a scaling factor, being the ratio between the sensed light level and the light level experienced at the target location.

Said scaling factor may be determined as:

$(L1-L2)/(Et1-Et2)$, where L1 is one of the one or more sensed light levels, L2 is zero or another of the one or more sensed light levels, Et1 is one of the one or more template levels corresponding to the illumination level at which L1 was sensed, and Et2 is zero or another of the one or more template light levels corresponding to the illumination level at which L2 was sensed.

In embodiments, the operation (a) above comprises adjusting a dimming level of the respective one or more light sources in order to cause the one or more non-zero (unknown) illumination levels.

In embodiments, at least the operations (a) and (c) above are performed automatically (and optionally also one, some or all of operations (b), (d), (e) and/or (f)).

According to another aspect of the present disclosure, there is provided a lighting system controller (i.e. a controller of a lighting system comprising one or more light sources and one or more sensors), wherein the lighting system controller is configured to perform a method of in accordance with any of the embodiments disclosed herein.

According to another aspect disclosed herein, there is provided a computer program product embodied on a computer-readable storage medium and configured so as when run on a lighting system controller to perform a method according to any of the embodiments disclosed herein.

BRIEF DESCRIPTION OF THE DRAWINGS

To assist understanding of the present disclosure and to show how embodiments may be put into effect, reference is made by way of example to the accompanying drawings in which:

FIG. 3 is a schematic illustration of another lighting system in which a light sensor is to be calibrated, and FIG. 4 is a flow chart of a method of calibrating a light sensor.

DETAILED DESCRIPTION OF EMBODIMENTS

Figure 1:
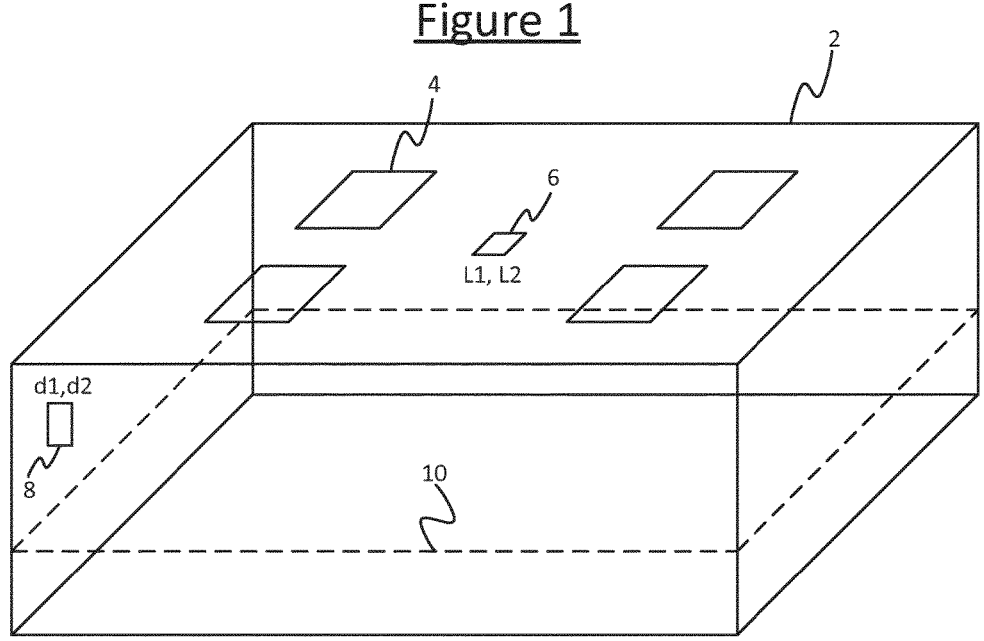
FIG. 1 is a schematic illustration of a lighting system in which a light sensor is to be calibrated.

FIG. 1 illustrates an example lighting system in accordance with embodiments of the present disclosure. The system comprises at least one light sensor 6 and a respective one or more luminaires 4 associated with the sensor 6. The sensor 6 and luminaire(s) 4 are installed in an environment 2 such as a room of a building (e.g. an office, hall, or corridor, etc.); or an outdoor space (e.g. garden, park, etc.); or any other covered or partially covered space (e.g. a gazebo or an interior of a vehicle). The system further comprises a controller 8 arranged to control the light output one or more luminaires 4 in dependence on the level of light in the environment 2, as sensed by the sensor 6 and reported to the controller 8 in the form of one or more sensor readings. The controller is configured to control of the light output of the luminaires 4 by controlling the dimming level in terms of any suitable measure such as intensity, luminance, luminous flux, illuminance, etc.; and the lights sensor 6 is configured to provide the sensor readings again in terms of any such measure.

The controller 8 may be implemented in a unit separate from the sensors, such as wall panel, desktop computer terminal, or even a portable terminal such as a laptop, tablet or smartphone. Alternatively the controller may be incorporated into the same unit as the sensor 6 and/or the same unit as one of the luminaires 4. Further, the controller 8 may be implemented in the environment 2 or remote from the environment (e.g. on a server of the building or even outside the building at a different geographical site); and the controller 8 may be implemented in a single unit or in the form of distributed functionality distributed amongst multiple separate units (e.g. a distributed server comprising multiple server units at one or more geographical sites, or a distributed control function distributed amongst the luminaires 4 or amongst the luminaires and sensor 6). Furthermore, the controller 8 may be implemented in the form of software stored on a memory (comprising one or more memory devices) and arranged for execution on a processor (comprising one or more processing units), or the controller 8 may be implemented in the form of dedicated hardware circuitry, or configurable or reconfigurable circuitry such as a PGA or FPGA, or any combination of these.

Regarding the various communication involved in implementing the functionality discussed below, to enable the controller 8 to receive the sensor readings from the sensor 6 and to control the light output of the luminaire(s) 4, these may be implemented in by any suitable wired and/or wireless means, e.g. by means of a wired network such as an Ethernet network, a DMX network or the Internet; or a wireless network such as a local (short range) RF network, e.g. a Wi-Fi, ZigBee or Bluetooth network; or any combination of these and/or other means.

The controller 8 receives an indication of a desired light output, i.e. a desired dimming level, expressed in terms of any suitable measure such as intensity, luminance, luminous flux, illuminance, etc. This is the target light level to be achieved at a certain location 10, in this case the workspace plane, e.g. desk height. This target light level may be specified for example by a user, or by other means such as from a dimming schedule timed according to a timer, or a fixed, pre-programmed level retrieved from memory or even being hardwired.

However, in a typical arrangement, the position of the sensor 6 is substantially removed from the workspace plane 10, in that the sensed level and target level cannot be assumed to be the same for the purpose of controlling the illumination for the application in question. For instance, often the sensor 6 is mounted facing down from the ceiling, arranged to detect light reflected upwards from one or more surfaces in the workspace plane (e.g. reflected from the desk). Therefore although the target level is the level desired for the workspace plane 10, the controller 8 can only judge the light by means of the sensor 6, which is not located at the workspace plane 10, but rather located on the ceiling and arranged to detect the amount of light reflected from the workspace plane 10. This reflected level is not constant for all environments, but rather depends on various factors of the environment such as the reflectivity of the surface(s) in the workspace plane 10, the distribution of the light luminaires 4, and the layout of the environment generally.

The goal of the calibration is to be able to find what value of the light sensor reading L would be sensed for a given target illumination level Es at the workspace plane 10. This value is the set-point, i.e. the value of light sensor reading Ls the controller 8 should aim for to achieve the desired illumination level Es at the workspace place. Put another way, the aim is to find the relationship between the sensed light level and the level of illumination actually incident on the workspace plane. Typically the relationship is linear or assumed to be linear, so this amounts to finding a scaling factor $\alpha$, i.e. Ls=$\alpha$·Es.

In a conventional calibration method, a commissioning technician would place a light meter below the light sensor 6 in the workspace plane 10, or at least at some position within the workspace plane 10. The technician would then use the controller 8 to set the dimming level of the luminaires 4 to two of more levels d1, d2 and for each measure the amount of light L1, L2 sensed by the light sensor 6, and the corresponding amount of light E1, E2 actually experienced at the workspace plane 10 as detected by the light meter. From these values it is possible to determine the scaling factor $\alpha$. However, this process is time consuming and cumbersome, and does not scale well over multiple rooms in building.

In the embodiments disclosed below on the other hand, there is provided an automatic, simplified way to perform light sensor calibration. This is based on defining an illumination template comprising one or more template values Et1, Et2 that define the achieved illumination at the workspace plane 10, and using this template to automatically determine the scaling factor $\alpha$ for calibration of defined lighting group sets.

Figure 2:
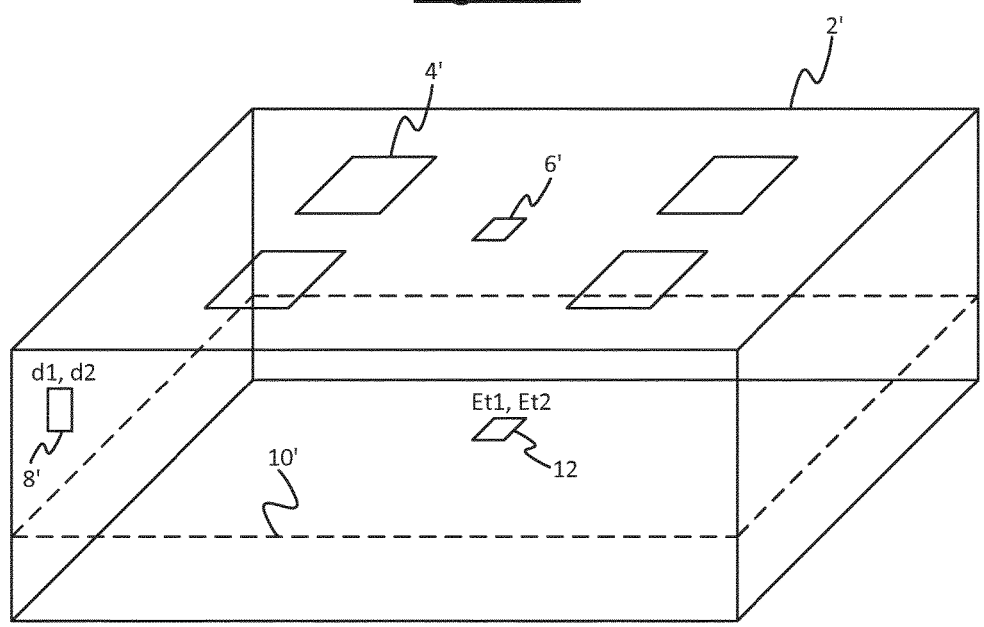
FIG. 2 is a schematic illustration of a template lighting system.

As illustrated in FIG. 2, in embodiments the template values are obtained by using measurements already taken from a light meter 12 in another environment 2' (the reference environment) having a similar arrangement of luminaires 4' and a similar layout (e.g. similar geometry, such as a similar room shape; and/or similar obstacles, such as a similar arrangement of desks and other office furniture); and thus having a similar illumination distribution. For instance, a commissioning technician may already have used the light meter 12 to perform a calibration of a sensor 6' installed in the other, similar environment 2' for controlling the luminaires 4' in said reference environment 2', and the light meter readings E1, E2 taken as part of this prior calculation are now used as template values Et1, Et2 for the calibration of the as-yet uncalibrated sensor 6 in the new environment 2. By different environment, it is meant that the environments 2, 2' experienced separate illumination (albeit happening to have similar illumination distributions), i.e. the illumination from one environment 2' one does not impinge on the other environment 2 to a significant degree and vice versa so the reading from meter 12 in the reference environment 2' has no causal link with the illumination in the target environment 2, and similarly the illumination in the reference environment 2' does not affect the dimming controlled by the sensor 6 in the target environment 2.

The template values Et1, Et2 can then be used by the controller 8 to automatically calibrate the sensor 6 in the new, target environment, without the commissioning technician needing to take new light meter readings in the target environment. Depending on the job at hand, this process could be repeated multiple times, e.g. room-by-room throughout a building, using the template values Et1, Et2 from a single reference room to calibrate each of a plurality of separate-but-similar rooms in the building. For instance this is likely to be a common scenario in an office building comprising a plurality of similar offices. Whatever the scenario, the target and reference environments 2, 2' (e.g. rooms) are considered approximately equivalent—in terms of their illumination distribution (e.g. distribution of luminaires 4, 4' and any other light sources such as windows) and their target locations (e.g. same workspace plane 10, 10')—if the calibration yields a suitable for the application in question. The margin of error beyond which the target and reference environments 2, 2' are no longer considered equivalent depends on the demands of the particular application, e.g. depending on what energy savings are desired, or what variation in the light level the occupant(s) can tolerate.

In an alternative variant of the above, the reference environment 2' in FIG. 2 may represent a modelled (virtual) environment, either modelled on a computer or even by means of manual (paper and pen) calculations. In this case the template values Et1, Et2 are the output of the model rather than an actual light meter 12.

FIG. 4 illustrates the various steps involved in the calibration of light sensors for daylight-integrated lighting control systems according to embodiments disclosed herein.

At step S10, groups of luminaires 4 are identified whereby the different groups are similar to one another in terms of their rendered illumination. For example, the groups may be the lighting systems in two different spaces (e.g. rooms) 2, 2' which, by lighting design, result in (nearly) same illumination over the workspace plane 10 when at the same dimming level d. As another example, the groups may be different groups of luminaires in a large open-office space that result in (nearly) same illumination over the workspace plane when at the same (e.g. maximum) dimming level. The luminaire groups may be identified in the lighting design phase, or later. Either way, the groups may be identified manually or with the assistance of a computer, e.g. based on similarity between aspects such as the nature of the installed luminaires 4, spacing between the luminaires 4, and characteristics of the room.

At step S20, templates are defined based on the installed illumination distribution, where the installed illumination distribution may be obtained by making illumination measurements at the workspace plane 10 in one of the spaces (e.g. rooms) 2' of one of the groups of luminaires 4', or from one or more models of the lighting systems in the target space (e.g. room) 2, or alternately obtained from a pre-specified finite set (e.g. specified by the system designer). An example of the template is an average illuminance value at the workspace plane 10 when the luminaires 4' in the modelled space 2' are dimmed to the same (e.g. maximum) dimming level as the target space 2. Or as another example, the template may be obtained by having a commissioning agent making illumination measurements at the workspace plane 10 using a light meter 12 in the modelled space 2' when the luminaires 4' of the reference space 2' dimmed to the same (e.g. maximum) dimming level as those of the target space 2. In the following, the template illuminance value will be denoted by Et.

At step S30, the template illuminance values Et1 and Et2 (corresponding to the luminaire group being at dimming level d1 and d2, respectively) are applied to the sensor(s) 6 in the group of luminaires 4 in the target environment(s) 2, such that all the light sensors 6 are calibrated for a specified workspace illuminance value Es. In particular, at light sensor indexed k, the light sensor values are measured by setting the group of luminaires 4 to dimming levels d1 and d2 (e.g. d1=1 and d2=0). Let the corresponding light sensor values be L1(k) and L2(k).

Then at step S40, the set-point Ls(k) for this light sensor k is obtained as:

$$Ls(k)=(L1(k)-L2(k))*Es/(Et1-Et2).$$

Since Es, Et1 and Et2 are approximately the same over all light sensors $6(k)$ of the different groups of luminaires 4 in the different environments 2, the set-points Ls(k) an be automatically obtained from the corresponding light sensor measurements L1(k) and L2(k).

Note that the dimming level d is not necessarily equal to the illumination level in the environment 2 if there is also ambient light such as daylight present (e.g. because the environment 2 has one or more windows letting in light from outdoors). If the calibration is performed with no daylight or other ambient light (i.e. no light apart from that emitted by the luminaires 4 controlled by the controller 8 for which the set-point is being calibrated) then the dimming level d is equal to the illumination level, but otherwise the illumination level is equal to the dimming level offset by the background ambient light level (e.g. current daylight level). In the latter case, the light sensor measurements under dimming levels d1 and d2 should preferably be taken within a short time window so as to ensure that daylight variation within the two measurements is minimal.

In embodiments, a check may also be performed to ensured that the light sensors L1(k) and L2(k) are substantially different from each other at dimming levels d1 and d2; else it is an indication that the light sensor may be saturated, especially when calibration is done during daytime. Thus an advantage of taking such an approach is that the calibration may be done even done under daylight conditions.

It is also preferable to set d1 and d2 not too close to each other, so as to be above the light sensor sensitivity and noise levels. In this sense the diming levels d1, d2 or output illumination levels may be said to be substantially different to one another.

It will be appreciated that the above embodiments have been described only by way of example.

For instance, the above method uses template calibration at two calibration points (d1, L1, Et1) and (d2, L2, Et2). If it is known that at d1=0, the light sensor measurement L1 is zero (e.g. in darkness at night-time), then the template-based calibration may be done using a single calibration points (d2, L2, Et2), i.e. by assuming (d1, L1, Et1)=(0, 0, 0). Alternatively, the calibration may be performed using two substantially non-zero calibration points under two substantially non-zero illumination levels. Substantially non-zero illumination levels means both illumination levels that corresponds to non-zero sensor reading and non-zero template values i.e. each greater than the sensitivity (light level resolution or quantization) of the light sensor 6, and each greater than the background noise level experienced by the sensor 6, with both non-zero values being different from one another by more than the sensor sensitivity and noise level. Further, to improve the calibration and make it more robust again luminaire dimming characteristics, measurements at multiple (>2) non-zero illumination levels (e.g. two non-zero dimming levels d1, d2) may be performed. In this case a best fit may be obtained across the template illuminance values and the light sensor values at the dimming levels to obtain the set-point.

Also, while the relationship between sensed light level and light level at the target location (e.g. workspace plane 10) is often expressed as a scaling fraction or ratio α, other more sophisticated relationships to be calibration may be known to a person skilled in the art. E.g. the relationship between sensed and workspace level need not necessarily be linear nor approximated as linear. Generally, one could fit any linear or non-linear relationship to any number of calibration points, and the same principle of using assumed template values Et in place of actual measured values E for the workspace (or target) illumination, as taught above, can still apply.

Further, the scope of the present disclosure is not necessarily limited to a sensor 6 mounted on the ceiling or to light reflected from one or more surfaces in a workspace plane 10 below. Generally, the target location (the location for which desired light level Es is defined) may be any point, line, plane, volume or more generally any place or region; and the sensor 6 may be located in any position separated from the target location such that it senses an amount of light that is related to the amount of light E at the target location but is substantially not equal to that amount of light (different beyond the sensitivity of the sensor 6 and the noise level experienced by the sensor 6).

Further, the scope of the present disclosure is not limited to the case where there is one sensor 6 per group of multiple luminaires 4. E.g. in an alternative arrangement as shown in FIG. 3, each luminaire 4 may have its own respective sensor 6 integrated into the same unit, or at least co-located with the respective luminaire 4. Optionally each luminaire 4 may be controlled by its own respective controller 8 coupled between the respective sensor 6 and the respective light source of the respective luminaire (e.g. integrated into the same unit as the respective luminaire 4), and arranged to control its light output based on the sensor reading from the respective sensor. Or each luminaire 4 could have its own sensor 6 but still be controlled by a centralized controller 8 common to a group of luminaires. Either way, the set-points for the sensors 6 may be calibrated based on template values in a similar manner to that discussed above. E.g. if the luminaires 4 are independent of one another, such that their respective sensor 6 of one does not receive a significant amount of light from the other(s) (such that it does not affect its control), then one of the luminaires 4 may be used to obtain the template values Et using a light meter, then the template values may be carried across to one or more others of the luminaires in a similar manner to the way template values are carried over from one environment 2' to another 2 in the above. Alternatively, if the luminaires 4 are not independent, such that their respective sensor 6 of one does receive a significant amount of light from the other(s) (such that it does affect its control), then one may still carry across template values from a similar group of luminaires in another, reference environment for the calibration of the group of luminaires 4 in the environment presently at hand.

Further, the one or more non-zero illumination levels in the target environment 2 do not necessarily have to be created by controlling the dimming level d of the luminaires 4. Alternatively, it is possible to take different respective sensor measurements L1, L2 with a blind or other window treatment open and closed, or with different combinations of window treatments. Or as another alternative, one could take the different sensor measurements L1, L2 at different times of day. Note that the dimming level d1, d2 or corresponding (unknown) illumination level of the target environment 2 does not actually enter into the calculation of the scaling factor α.

Furthermore, while it is preferred that any or all of the above steps are implemented automatically by the controller 8, it is not excluded that one, some or all steps above may be performed manually by the commissioning technician.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of calibrating one or more light sensors, in a target environment where each of the one or more light sensors is arranged to control a respective one or more light sources for providing or contributing to an illumination in the target environment, based on sensing a light level; the method comprising, for each of the one or more light sensors:
   a) under influence of one or more substantially non-zero levels of said illumination, using the light sensor to measure the light level corresponding to each of said one or more illumination levels;
   b) receiving a template light level value corresponding to each of the one or more illumination levels, representing a light level at a target location in the target environment substantially removed in space from a location of the light sensor, each of the one or more template light level values being assumed for said environment rather than measured by a light meter; and
   c) determining a relationship between the sensed light level and the light level experienced at the target location, based on an evaluation of the one or more sensed levels relative to the one or more template light level values,
   wherein the template light level values are measurements from a light meter in another environment, based on an assumption that said other environment is approximately equivalent to said target environment, having an approximately equivalent illumination distribution, and that the light meter is placed at an approximately equivalent location to said target location.

2. The method of claim 1, further comprising:
   a) receiving an indication of a desired light level for the target location;
   b) for each of the one or more light sensors, determining a set-point for the light sensor based on the determined relationship between the sensed light level and the light level at the target location, the set-point specifying a target value for the sensed light level in order to achieve a desired light level at the target location; and
   c) adjusting the respective one or more light sources until the target value for the sensed light level is sensed by the light sensor.

3. The method of claim 2, wherein the receiving of said indication of the desired light level comprises any one of:
   receiving the indication of the desired light level as a user input,
   retrieving the indication from a predetermined store in memory, or
   receiving the indication based on a timer.

4. The method of claim 1, wherein the receiving of said one or more template light level values comprises any one of:
   retrieving the one or more template light level values from a predetermined store in memory,
   receiving the one or more template light values as a user input,
   receiving the one or more template light level values from a computer model of the target environment, or
   measuring the one or more template light level values from a light meter in another environment, based on an assumption that said other environment is approximately equivalent to said target environment, having an approximately equivalent illumination distribution, and that the light meter is placed at an approximately equivalent location to said target location.

5. The method of claim 1, wherein the template levels are based on a computer model or other model of the target environment.

6. The method of claim 1, wherein the template light level values are selected from a pre-specified finite set.

7. The method of claim 1, wherein the one or more sensed light levels comprise at least two sensed light levels, and the one or more template light level values comprise two corresponding template light level values; the determining of said relationship being based on an evaluation of a difference between the two sensed light levels relative to a difference between the two template light level values, or by performing a fit of the two or more sensed light levels to a predetermined relationship.

8. The method of claim 1, wherein the one or more sensed levels are a single sensed light level and the one or more template light level values are a single corresponding template light level value; the determining of said relationship being based on an evaluation of the single sensed light level relative to the single template light level value, by assuming as a second calibration point that the sensed light level is zero when the illumination level is zero.

9. The method of claim 1, wherein the determining of said relationship comprises determining a scaling factor, being the ratio between the sensed light level and the light level experienced at the target location.

10. The method of claim 9, wherein said scaling factor is determined as:

$$(L1-L2)/(Et1-Et2),$$

where L1 is one of the one or more sensed light levels, L2 is zero or another of the one or more sensed light levels, Et1 is one of the one or more template levels corresponding to the illumination level at which L1 was sensed, and Et2 is zero or another of the one or more template light levels corresponding to the illumination level at which L2 was sensed.

11. The method of claim 1, wherein a) comprises adjusting a dimming level of the respective one or more light sources (4) to cause said one or more non-zero illumination levels.

12. The method of claim 1, wherein at least a) and c) are performed automatically.

13. A lighting system controller configured to perform the method of claim 1.

14. A computer program product embodied on a computer-readable storage medium and configured so as when run on a lighting system controller to perform the method of claim 1.

* * * * *